(12) United States Patent
Lee

(10) Patent No.: US 8,130,619 B2
(45) Date of Patent: Mar. 6, 2012

(54) METHOD OF RECORDING INFORMATION TO AND REPRODUCING INFORMATION FROM AN OPTICAL INFORMATION STORAGE MEDIUM

(75) Inventor: Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 12/760,097

(22) Filed: Apr. 14, 2010

(65) Prior Publication Data
US 2010/0195465 A1    Aug. 5, 2010

Related U.S. Application Data

(63) Continuation of application No. 11/429,966, filed on May 9, 2006, now Pat. No. 7,742,375, which is a continuation of application No. 10/769,986, filed on Feb. 3, 2004, now abandoned.

(30) Foreign Application Priority Data

Feb. 3, 2003 (KR) .................................. 2003-6499

(51) Int. Cl.
*G11B 7/005* (2006.01)
(52) U.S. Cl. ................... 369/59.25; 369/275.3
(58) Field of Classification Search ............ 369/275.3, 369/275.4, 59.25
See application file for complete search history.

(56) References Cited

U.S. PATENT DOCUMENTS

| | | | |
|---|---|---|---|
| 5,617,408 A | 4/1997 | Nishizawa et al. | |
| 5,688,173 A | 11/1997 | Kitahara et al. | |
| 6,034,937 A | 3/2000 | Kumagai | |
| 6,128,272 A | 10/2000 | Horimai et al. | |
| 6,411,585 B1 | 6/2002 | Kobayashi | |
| 6,414,920 B1 | 7/2002 | Lee | |
| 6,930,977 B1 | 8/2005 | Kondo et al. | |
| 6,965,555 B2 | 11/2005 | Ueki | |
| 7,136,348 B2 | 11/2006 | Irie et al. | |
| 7,200,085 B2 | 4/2007 | Kanda et al. | |
| 7,742,375 B2* | 6/2010 | Lee | 369/59.25 |
| 2001/0006575 A1* | 7/2001 | Shimoda et al. | 386/46 |
| 2001/0007545 A1* | 7/2001 | Ueda et al. | 369/47.15 |
| 2002/0024924 A1 | 2/2002 | Endoh et al. | |
| 2002/0049678 A1* | 4/2002 | Oshima et al. | 705/51 |

(Continued)

FOREIGN PATENT DOCUMENTS

CN    1103539    6/1995

(Continued)

OTHER PUBLICATIONS

Japanese Office Action issued on Jan. 26, 2010, in corresponding Japanese Patent Application No. 2006-502694 (2 pages).

(Continued)

*Primary Examiner* — Wayne Young
*Assistant Examiner* — Thomas D Alunkal
(74) *Attorney, Agent, or Firm* — NSIP Law

(57) ABSTRACT

A method of recording information to a read-only optical information storage medium comprising a plurality of areas, including: recording data in at least one of the plurality of areas in the form of pits in a first pit pattern; and recording data in others of the plurality of areas in the form of pits in a second pit pattern different from the first.

5 Claims, 9 Drawing Sheets

U.S. PATENT DOCUMENTS

| | | | |
|---|---|---|---|
| 2002/0060968 A1* | 5/2002 | Senshu | 369/59.25 |
| 2002/0172120 A1 | 11/2002 | Kato et al. | |
| 2003/0016603 A1* | 1/2003 | Tomita | 369/47.3 |
| 2003/0053404 A1* | 3/2003 | Kondo | 369/275.4 |
| 2003/0202436 A1 | 10/2003 | Tomita et al. | |
| 2004/0027943 A1 | 2/2004 | Furumiya et al. | |
| 2004/0156306 A1 | 8/2004 | Lee | |
| 2004/0208112 A1 | 10/2004 | Lee | |
| 2004/0228251 A1 | 11/2004 | Lee | |
| 2006/0198289 A1 | 9/2006 | Lee | |

FOREIGN PATENT DOCUMENTS

| | | |
|---|---|---|
| CN | 1122939 | 5/1996 |
| CN | 1216139 | 5/1999 |
| CN | 1221509 | 6/1999 |
| EP | 1 058 254 | 12/2000 |
| EP | 1 271 490 | 1/2003 |
| JP | 11-025605 | 1/1999 |
| JP | 11-045461 | 2/1999 |
| JP | 2002-42347 | 2/2002 |
| JP | 2002-074664 | 3/2002 |
| JP | 2003-006997 | 1/2003 |
| KR | 2002-84671 | 11/2002 |
| KR | 2003-12731 | 2/2003 |
| KR | 2003-92589 | 12/2003 |
| KR | 2004-1596 | 1/2004 |
| KR | 2004-9358 | 1/2004 |
| KR | 10-0727919 | 6/2007 |
| TW | 408313 | 10/2000 |
| TW | 460860 | 10/2001 |
| TW | 440024 | 6/2007 |
| WO | WO 01/06502 | 1/2001 |
| WO | WO 01/88917 | 11/2001 |
| WO | WO 2004/021337 | 3/2004 |
| WO | WO 2004/023463 | 3/2004 |
| WO | WO 2004/051633 | 6/2004 |

OTHER PUBLICATIONS

Korean Office Action issued on Nov. 20, 2006, in corresponding Korean Patent Application No. 2003-6499 (2 pages).
Office Action issued on Feb. 14, 2007 by the Taiwanese Patent Office for Taiwanese Patent Application No. 93102358.
Office Action dated Dec. 7, 2007 of the Chinese Patent Application No. 200480001756.2.
Search Report dated Feb. 20, 2008 of the European Patent Application No. 04707688.0.
Office Action dated Jul. 11, 2008 of the Chinese Patent Application No. 200480001756.2.
Search Report dated Dec. 23, 2008 in related European Application No. 08163288.7.
Substantive/Modified Examination Adverse Report issued on May 22, 2009 of the Malaysian Application No. PI20040322.
Substantive/Modified Substantive Examination Clear Report issued by the Intellectual Property Corporation of Malaysia on Jun. 19, 2009.
Japanese Notive of Preliminary Reexamination issued on Oct. 18, 2011, in counterpart Japanese Patent Applicatin No. 2006-502694 (6 pages, including English translation).
Mexican Office Action issued on Aug. 17, 2011, in counterpart Mexican Patent Application No. MX/a/2008/003864 (2 pages).

* cited by examiner

METHOD OF RECORDING INFORMATION TO AND REPRODUCING INFORMATION FROM AN OPTICAL INFORMATION STORAGE MEDIUM

CROSS-REFERENCE TO RELATED APPLICATIONS

This application is a continuation application of U.S. patent application Ser. No. 11/429,966, filed on May 9, 2006, which is a continuation application of U.S. patent application Ser. No. 10/769,986, filed on Feb. 3, 2004, and this application also claims the priority of Korean Patent Application No. 2003-6499, filed on Feb. 3, 2003, in the Korean Intellectual Property Office, the disclosure of each which is incorporated herein in their entirety by reference for all purposes.

BACKGROUND OF THE INVENTION

1. Field of the Invention

The present invention relates to information recording/and reproducing methods, and more particularly, to a method of recording information to and reproducing information from an optical information storage medium having a plurality of areas in which data is recorded according to different recording modulation methods or as different pit wobbles.

2. Description of the Related Art

Optical discs are generally used as information storage media of optical pickup devices which record information on and/or reproduce information from the optical discs without contacting the optical discs. Optical discs are classified as either compact discs (CDs) or digital versatile discs (DVDs) according to their information recording capacity. CDs and DVDs further include 650 MB CD-Rs, CD-RWs, 4.7 GB DVD+RWs, and so forth.

The above-mentioned optical information media are standardized and compatible with one another, rendering them economical and convenient to use. Attempts to standardize storage media that are not standardized have been made. In particular, the formats of new storage media have to be developed so that the new storage media are compatible with or consistent with existing storage media.

As shown in FIG. 1, a conventional read-only optical disc includes a burst cutting area (BCA) 10, a lead-in area 20, a user data area 30, and a lead-out area 40. Information such as a serial number of the conventional read-only optical disc is recorded as a bar code in the BCA 10, and conventional read-only disc-related information is recorded in the lead-in area 20.

SUMMARY OF THE INVENTION

The present invention provides an optical information storage medium which can maintain consistency with other types of optical information storage media and prescribe a recording pattern or recording modulation method so as to improve compatibility with a drive.

According to an aspect of the present invention, there is provided a method of recording information to a read-only optical information storage medium having a plurality of areas including recording data in at least one of the plurality of areas in the form of pits in a first pit pattern and recording data in others of the plurality of areas in the form of pits in a second pit pattern different from the first.

The plurality of areas may include a burst cutting area, a lead-in area, a user data area, and a lead-out area.

A pattern of pits formed in the burst cutting area may be different from a pattern of pits formed in at least one of the lead-in area and the user data area.

The pattern of the pits formed in the burst cutting area may be one of a first straight pit row and a first pit wobble, and the pattern of the pits formed in at least one of the lead-in area and the user data area is one of a second straight pit row that is different from the first straight pit row and a second pit wobble that is different from the first pit wobble.

The lead-in area may include first and second areas, pits are formed in the first area in one of a third straight pit pattern and a third pit wobble pattern, and pits may be formed in the second area in one of a fourth straight pit pattern and a fourth pit wobble pattern.

Each of the third straight pit pattern and the fourth straight pit pattern may be one of a single straight pit pattern, a specific straight pit pattern, or a random straight pit pattern.

Each of the third pit wobble and the fourth pit wobble may be one of a single pit wobble, a specific pit wobble, and a random pit wobble. The user data area may include a plurality of basic recording units, and run-ins and run-outs that are respectively located before and after the basic recording units.

According to another aspect of the present invention, there is provided a method of recording information to read-only optical information storage medium including a plurality of areas including recording data in at least one of the plurality of areas in the form of pits according to a first modulation method and recording data in others of the plurality of areas in the form of pits according to a second modulation method different from the first.

The plurality of areas may include a burst cutting area, a lead-in area, a user data area, and a lead-out area. A recording modulation method used in the burst cutting area may be different from a recording modulation method used in at least one of the lead-in area and the user data area. The recording modulation method used in the burst cutting area, the lead-in area, and the user data area may be one of a RLL (d, k) modulation method and a bi-phase modulation method.

At least one of the burst cutting area, the lead-in area, the user data area, and the lead-out area may be divided into a plurality of sub-areas, and the pits in the sub-areas may use different modulation methods.

According to yet another aspect of the present invention, there is provided a method of recording data on a read-only optical information storage medium including: recording data in one of a plurality of areas using one a first pit pattern and a first recording modulation method, the first pit pattern and a first recording modulation method prescribed by the medium; and recording data in at least one of the other of the plurality of areas using one of a second pit pattern and a second recording modulation method. Only the second pit pattern is used to record data in the at least one of the other of the plurality of areas when the first pit pattern is used to record data in the one of the plurality of areas. Only the second modulation method is used to record data in the at least one of the other of the plurality of areas when the first modulation method is used to record data in the one of the plurality of areas.

According to yet another aspect of the present invention, there is provided a method of recording information to a read-only optical information storage medium including a plurality of recording layers each having a plurality of areas including recording data in at least one of the plurality of areas in the form of pits in a first pit pattern and recording data in others of the plurality of areas in the form of pits in a second pit pattern different from the first.

According to yet another aspect of the present invention, there is provided method of reproducing information from a read-only optical information storage medium having a plurality of areas, including: reading data recorded in at least one of the plurality of areas in the form of pits in a first pit pattern; and reading data recorded in others of the plurality of areas in the form of pits in a second pit pattern different from the first.

According to still another aspect of the present invention, there is provided a method of recording information from a read-only optical information storage medium comprising a plurality of areas, including: reading data recorded in the form of pits in at least one of the plurality of areas according to a first modulation method; and reading data recorded in the form of pits in the others of the plurality of areas according to a second modulation method different from the first.

According to a further aspect of the present invention, there is provided a method of recording information to a read-only optical information storage medium comprising a plurality of recording layers, including: reading data recorded in at least one of the plurality of areas in the form of pits in a first pit pattern; and reading data recorded in others of the plurality of areas in the form of pits in a second pit pattern different from the first.

According to yet another aspect of the present invention, there is provided a method of recording information to and reproducing information from a read-only optical information storage medium comprising a plurality of recording layers. The method includes: recording data in at least one of the plurality of areas in the form of pits in a first pit pattern; recording data in others of the plurality of areas in the form of pits in a second pit pattern different from the first; and reading the data from the at least one of the plurality of areas and from at least one of the others of the plurality of areas.

According to yet another aspect of the present invention, there is provided a method of recording information to and reading information from a read-only optical information storage medium comprising a plurality of areas. The method includes: recording data in the form of pits in at least one of the plurality of areas according to a first modulation method; recording data in the form of pits in the others of the plurality of areas according to a second modulation method different from the first modulation method; and reading the data from the at least one of the plurality of areas and from at least one of the others of the plurality of areas.

Additional and/or other aspects and other advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF EMBODIMENTS

Figure 1:
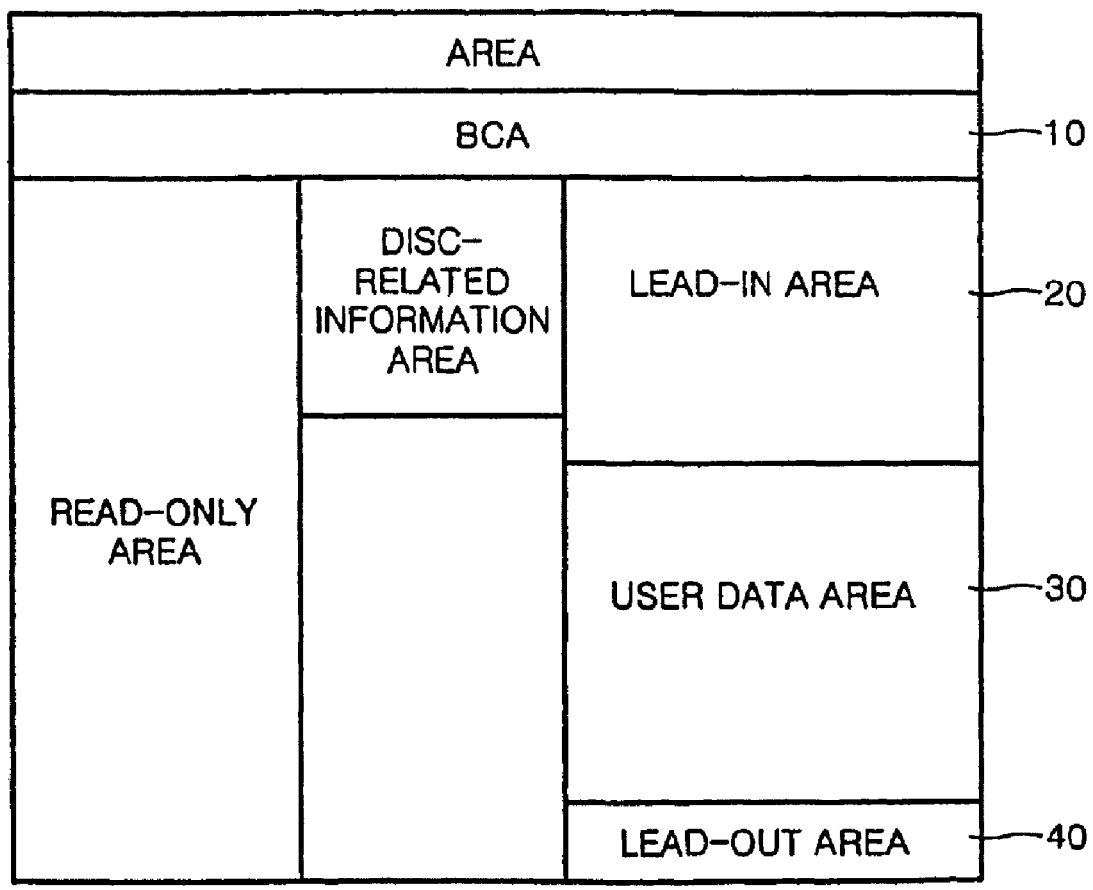
FIG. 1 illustrates the overall structure of a conventional read-only optical information storage medium.

Reference will now be made in detail to embodiments of the present invention, examples of which are illustrated in the accompanying drawings, wherein like reference numerals refer to the like elements throughout. The embodiments are described below to explain the present invention by referring to the figures.

An optical information storage medium usable with a recording and/or a reproducing method according to an embodiment of the present invention is a read-only optical information storage medium. The optical information storage medium is divided into a plurality of areas according to function or use purpose. A recording modulation method or a recording pattern used in a portion of the plurality of areas is different from a recording modulation method or a recording pattern used in the remaining portion of the plurality of areas.

As described above, the optical information storage medium is divided into a plurality of areas according to function or use. For example, as shown in FIG. 1, the optical information storage medium includes a BCA 10, a lead-in area 20, a user data area 30, and a lead-out area 40. Also, data is recorded as pits everywhere on the optical information storage medium. In other words, data is recorded as pits in the BCA 10, the lead-in area 20, the user data area 30, and the lead-out area 40. Thus, the read-only optical information storage medium is consistent with a recordable optical information storage medium in that data is recorded as groove wobbles everywhere on the recordable optical information storage medium.

Information on a serial number of the optical information storage medium or information indicating the BCA 10 is recorded as pits in the BCA 10. Disc-related (or optical information storage medium-related) information, copy protection information, and so forth are recorded in the lead-in area 20. For example, the disc-related information includes information on the type of a storage medium such as a recordable disc, write-one disc, or a read-only disc, information on the number of recording layers, information on the recording speed, and information on the size of the disc.

On an optical information storage medium resulting from a recording and/or a reproducing method according to an embodiment of the present invention, patterns of pits formed in or recording modulation methods used in the BCA 10, the lead-in area 20, the user data area 30, and the lead-out area 40 are different.

The different patterns of the pits formed in the BCA 10, the lead-in area 20, the user data area 30, and the lead-out area 40 will be described. For example, the pattern of pits formed in the BCA 10 may be different from the patterns of pits formed in the lead-in area 20, the user data area 30, and the lead-out area 40. Here, the pattern of the pits formed in the BCA 10 may be a straight pit row or a pit wobble. A straight pit row has pits arranged in a straight row and a pit wobble has pits arranged in a waveform.

Figure 2A:
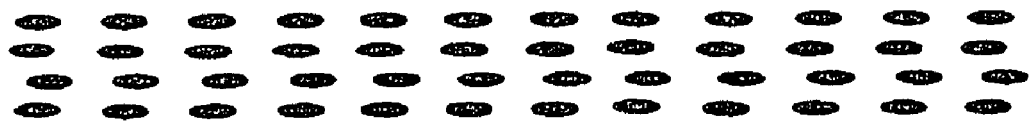
FIG. 2A illustrates a pit row having a single straight pattern.
Figure 2B:
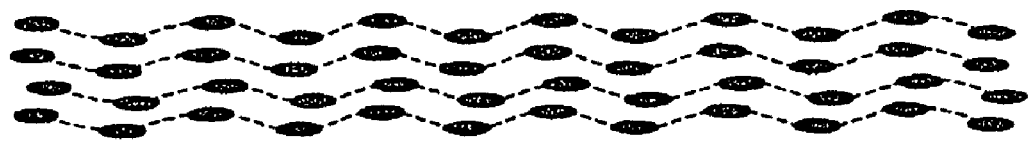
FIG. 2B illustrates a pit wobble having a single pattern.

The pattern of the straight pit row and the pit wobble may be a single pattern, a specific pattern, or a random pattern. The single pattern refers to a pattern in which pits of length nT are arranged at regular intervals. Here, n denotes a natural number and T denotes the minimum pit length. For example, as shown in FIG. 2A, the single pattern of the straight pit row refers to pits of the same length arranged in a straight row. As shown in FIG. 2B, the single pattern of the pit wobble refers to pits of the same length arranged in a waveform.

Figure 2C:
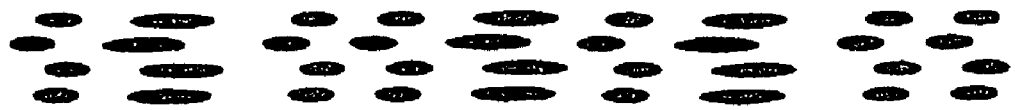
FIG. 2C illustrates a pit row having a specific straight pattern.
Figure 2D:
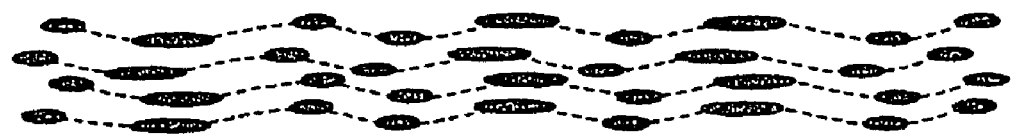
FIG. 2D illustrates a pit wobble having a specific pattern.

The specific pattern indicates that a sequence of pits of different lengths is repeated. For example, a sequence of pits of lengths 3T and 6T may be repeated. Here, a sync pattern may have pits of length 9T. As shown in FIG. 2C, the specific pattern of the straight pit row refers to specific pits arranged in a straight row. As shown in FIG. 2D, the specific pattern of the pit wobble refers to specific pits arranged in a waveform.

Figure 2E:
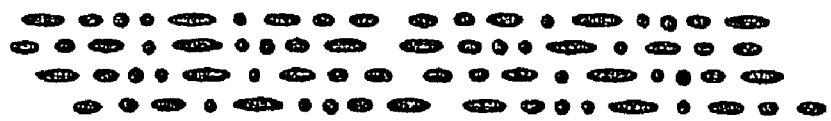
FIG. 2E illustrates a pit row having a random straight.
Figure 2F:
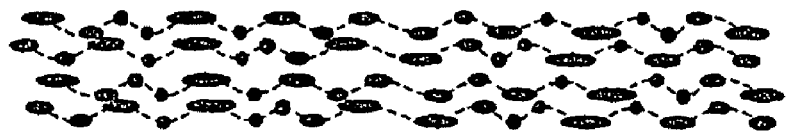
FIG. 2F illustrates a pit wobble having a random pattern.

The random pattern refers to pits of different lengths arranged at irregular intervals. For example, as shown in FIG. 2E, the random pattern of the straight pit row refers to pits of different lengths arranged in a straight row at random. As shown in FIG. 2F, the random pattern of the pit wobble refers to pits of different lengths arranged in a waveform at random.

Pits are formed in one of the single, specific, and random patterns of the straight pit row, and the single, specific, and random patterns of the pit wobble in the BCA 10. Pits are formed in a different pattern from that used in the BCA 10 in the lead-in area 20 and the user data area 30.

Figure 3A:
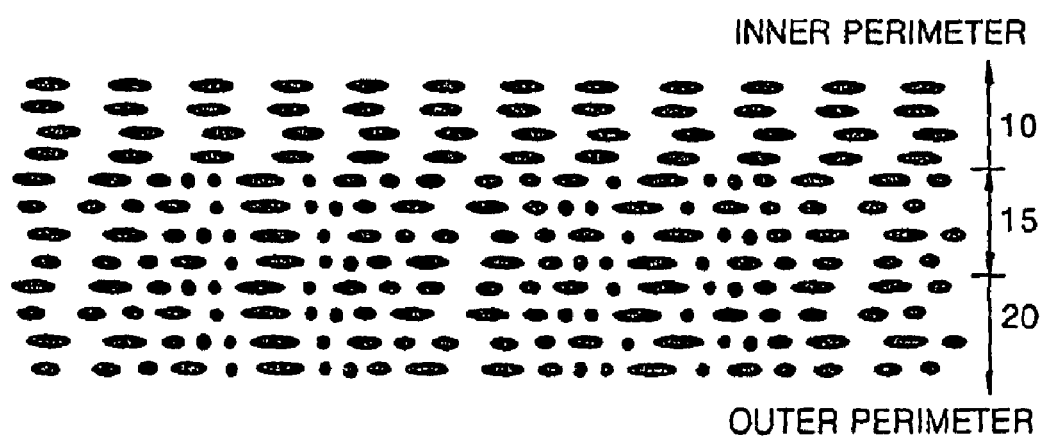
FIGS. 3A through 3D, 4A, and 4B illustrate a pattern of pits formed in each area of an optical information storage medium usable with and/or resulting from a recording and/or a reproducing method according to an embodiment of the present invention.
Figure 3B:
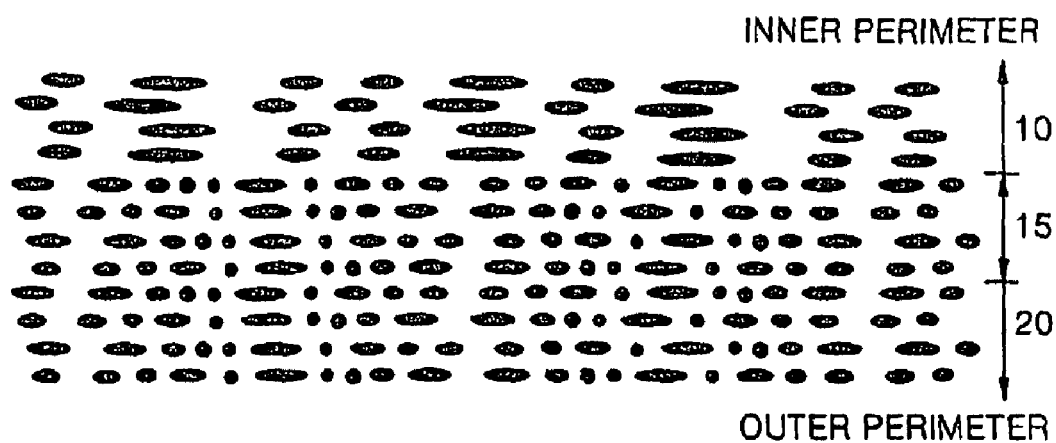
Figure 3C:
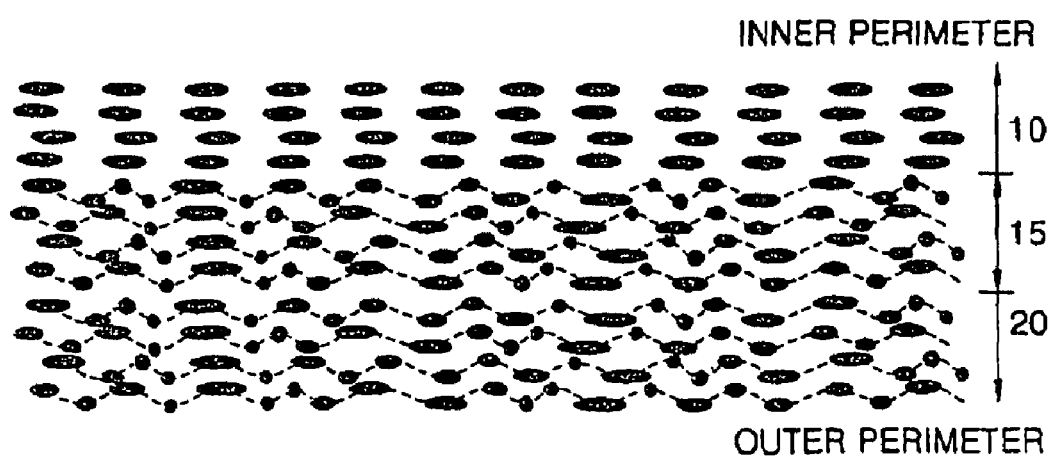
Figure 3D:
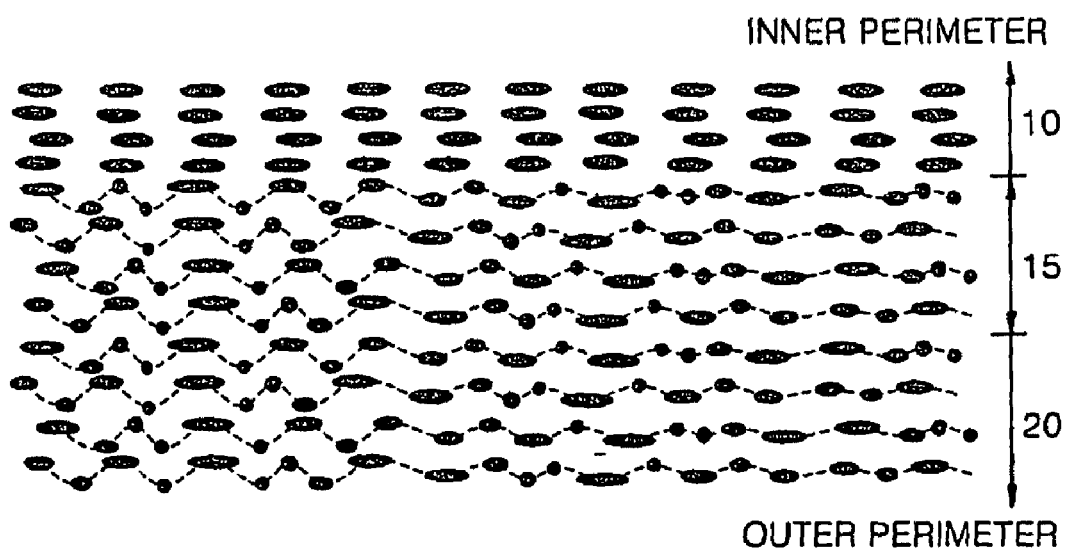

In detail, as shown in FIG. 3A, pits are formable in the single pattern of the straight pit rows in the BCA 10, and in the random pattern of the straight pit rows in the lead-in area 20 and the user data area 30. As shown in FIG. 3B, pits may be formed in the specific pattern of the straight pit rows in the BCA 10, and in the random pattern of the straight pit rows in the lead-in area 20 and the user data area 30. As another example, as shown in FIG. 3C, pits may be formed in the signal pattern of the straight pit rows in the BCA 10, and in the random pattern of the pit wobble in the lead-in area 20 and the user data area 30. In particular, in the case of the random pattern of the pit wobble, as shown in FIG. 3D, an amplitude of pit wobbles may gradually decrease or increase.

Here, a tracking servo for read-only data is generally performed according to a differential phase detect (DPD) method. The DPD method is known, and thus a detailed description thereof is omitted. If read-only data is recorded in the single pattern, a DPD signal is not detected. Thus, in this case, the DPD method cannot be used. However, in the present embodiment, information recorded in the BCA is read using only a focusing servo. Therefore, the DPD method does not affect the BCA 10. In other words, as shown in FIGS. 3A, 3C, and 3D, although pits are formed in the single pattern in the BCA 10, it is not necessary to use the tracking servo. As a result, data is readable from the lead-in area 20, the user data area 30, and the lead-out area 40, but not the BCA 10, using the DPD method.

As another example, pits are formable in the random pattern of the straight pit row in the BCA 10, and in the random pattern of the straight pit row or the random pattern of the pit wobble in the lead-in area 20 and the user data area 30. Alternatively, pits may be formed in the random pattern of the straight pit row in the BCA 10, and in the random pattern of the pit wobble in the lead-in area 20 or the user data area 30. Here, if pits are formed in the random pattern in the BCA 10, the pattern of the pits may be a "00h" pattern or a pattern containing information for representing the BCA 10.

Figure 4A:
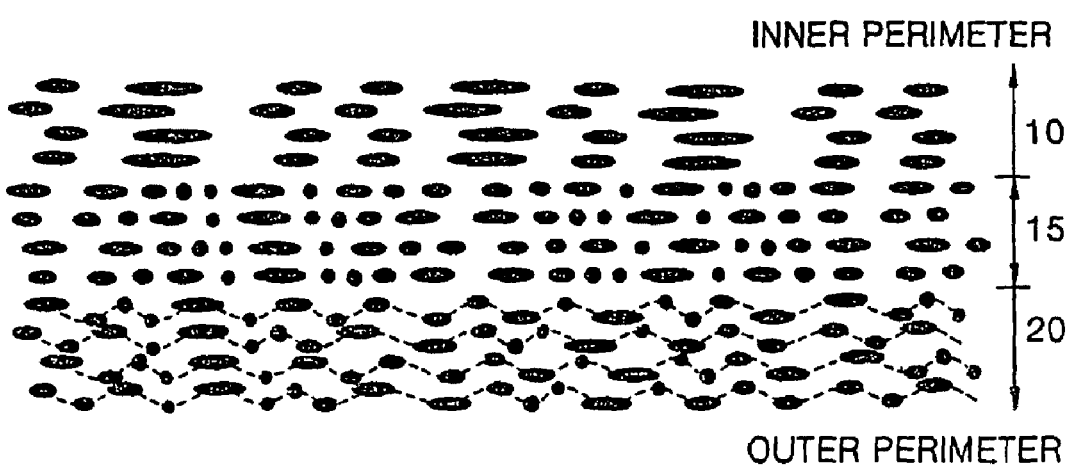
Figure 4B:
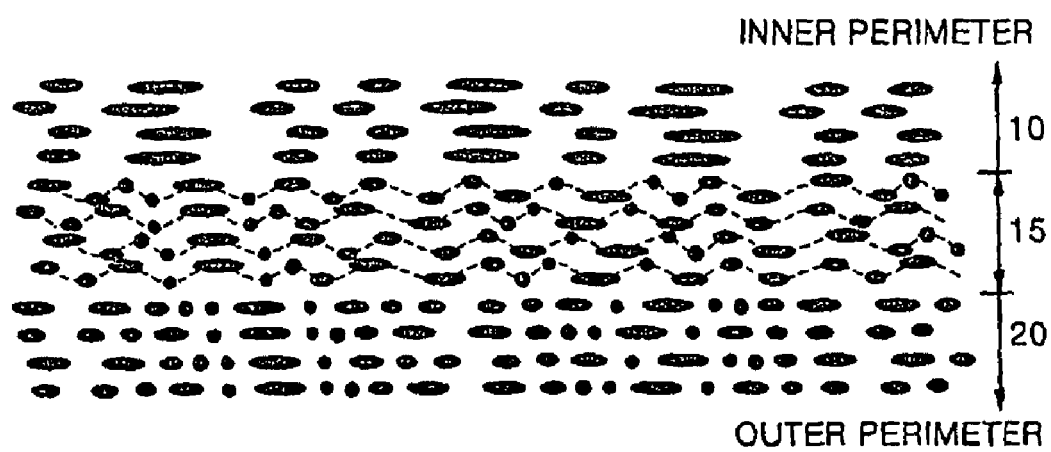

Also, pits are formable in different pit patterns in the BCA 10, the lead-in area 20, and the user data area 30. For example, as shown in FIG. 4A, pits are formable in the single pattern of the straight pit row in the BCA 10, in the random pattern of the straight pit row in the lead-in area 20, and in the random pattern of the pit wobble in the user data area 30. Alternatively, as shown in FIG. 4B, pits are formable in the specific pattern of the straight pit row in the BCA 10, in the random pattern of the pit wobble in the lead-in area 20, and in the random pattern of the straight pit row in the user data area 30.

Different recording modulation methods used in the BCA 10, the lead-in area 20, and the user data area 30 will now be explained.

A recording modulation method used in the BCA 10 is a RLL (d, k) modulation method or a bi-phase modulation method, and a different recording modulation method, is used in the lead-in area 20, the user data area 30, and the lead-in area 40.

Figure 5A:
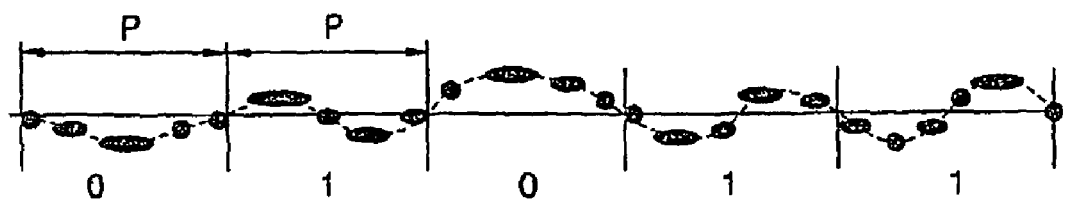
FIGS. 5A and 5B are views for explaining a bi-phase modulation method.

Bi-phase modulation refers to a method of displaying data depending on whether a signal varies within a predetermined period P. For example, as shown in FIG. 5A, when the phase of a groove wobble does not change within a predetermined period P, a bit value "0" is read. When the phase of the groove wobble changes within the predetermined period P, a bit value "1" is read. In other words, the bi-phase modulation method is a method of recording data depending on whether a signal varies within a given period, e.g., depending on whether the phase of a signal changes within a given period. Here, modulation of the phase of a groove wobble has been described, but various patterns may be modulated.

Figure 5B:
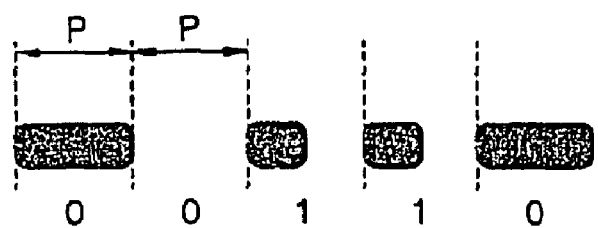

As shown in FIG. 5B, if a pit does not change within a given period P, a bit of value "0" (or "1") is read, and if the pit changes within the given period P, a bit of value "1" (or "0") is read. In other words, if a pit is formed everywhere within the given period P, a bit of value "0" (or "1") is read, and if a pit and a space are formed within the given period P, a bit of value "1" (or "0") is read.

The RLL modulation method indicates how many bits of value "0" exist between two bits of value "1". Here, RLL (d, k) indicates that the minimum number and the maximum number of bits of value "0" between two bits of value "1" are d and k, respectively. For example, in a RLL (1, 7) modulation method, the minimum number and the maximum number of bits of value "0" between two bits of value "1" are 1 and 7, respectively. According to the RLL (1, 7) modulation method, when d=1, data of "1010101" is recorded and thus a mark of length 2T is formed between two bits of value "1". Also, when d=7, data of "10000000100000001" is recorded and thus a mark of length 8T is formed between two bits of value "1". Here, T denotes the minimum mark length, i.e., the minimum pit length. Thus, in the RLL (1, 7) modulation method, data is recorded as marks and spaces of length 2T to 8T.

As described in the above example, the recording modulation method used in the BCA 10 is different from the recording modulation methods used in the lead-in area 20, the user data area 30, and the lead-out area 40. Alternatively, the recording modulation method used in the lead-in area 20 may be different from the recording modulation methods used in the BCA 10, the user data area 30, and the lead-out area 40. For example, the recording modulation method used in the lead-in area 20 may be the RLL (d, k) modulation method or the bi-phase method, and the recording modulation method used in the BCA 10, the user data area 30, and the lead-out area 40 may be different from the recording modulation method used in the lead-in area 20.

A track pitch of the pits formed in the BCA 10 may be equal to or different from a track pitch of the pits formed in the lead-in area 20 and/or the user data area 30.

An optical information storage medium resulting from a recording and/or a reproducing method according to another embodiment of the present invention is divided into a plurality of areas according to function or use. A pit pattern or a recording modulation method used in a portion of the plurality of areas is different from pit patterns or recording modulation methods used in the remaining portion of the plurality of areas.

Figure 6:
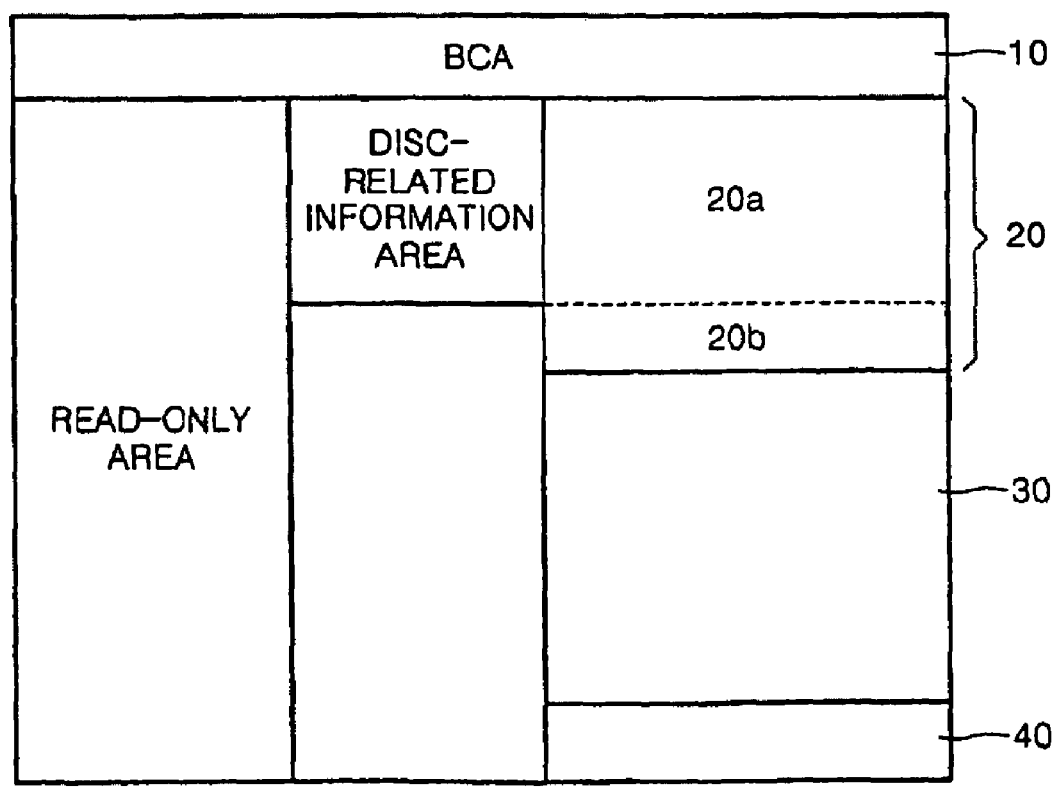
FIG. 6 illustrates the overall structure of an optical information storage medium usable with and/or resulting from a recording and/or a reproducing method according to another embodiment of the present invention.

For example, the lead-in area 20 may be divided into a plurality of sub-areas. In other words, as shown in FIG. 6, when the lead-in area 20 is divided into a first area 20*a* and a second area 20*b*, pits may be formed in different pit patterns or according to different modulation methods in the first area 20*a* and the second area 20*b*. Pits are formed in the single, specific, or random pattern of the straight pit rows, or the single, specific, or random pattern of the pit wobbles in the first area 20*a*. Pits are formed in a pattern different from that in the first area 20*a*, in the second area 20*b*.

Figure 7A:
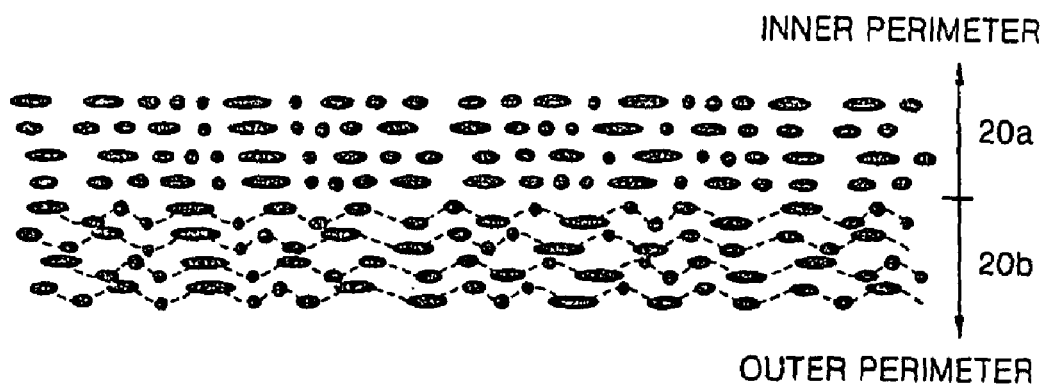
FIGS. 7A, 7B, 8A, and 8B illustrate a pattern pits formed in each area of the optical information storage medium shown in FIG. 6.
Figure 7B:
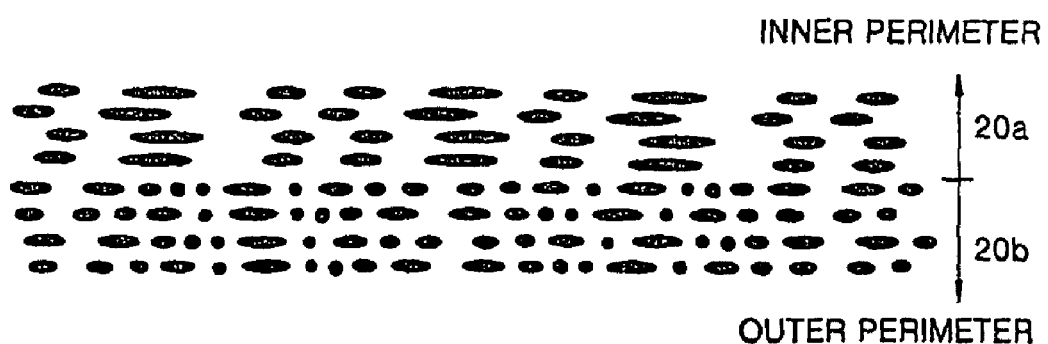

For example, as shown in FIG. 7A, pits are formable in the random pattern of the straight pit rows in the first area 20*a*, and in the random pattern of the pit wobbles in the second area 20*b*. Alternatively, as shown in FIG. 7B, pits are formable in the specific pattern of the straight pit rows in the first area 20*a*, and in the random pattern of the straight pit rows in the second area 20*b*.

Figure 8A:
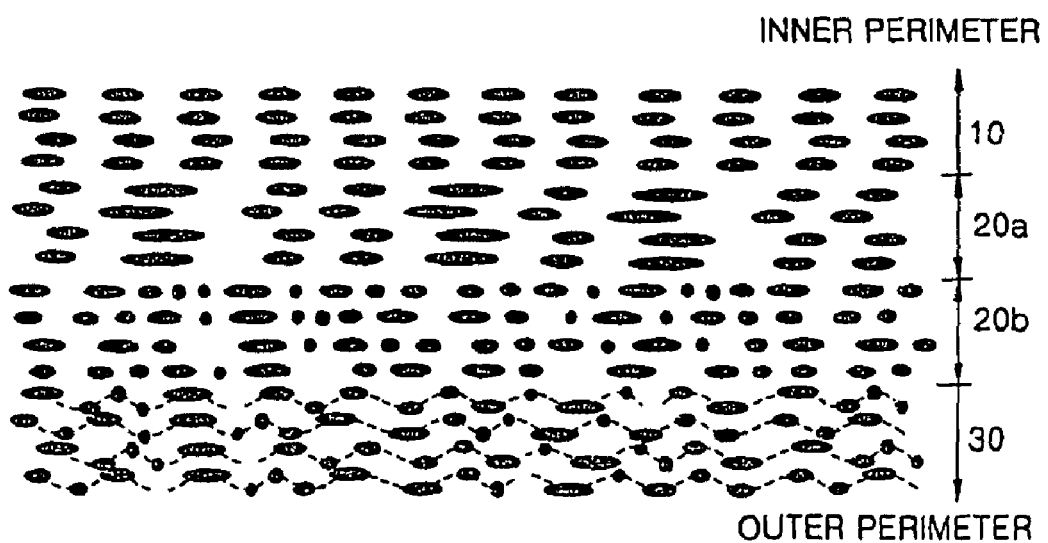
Figure 8B:
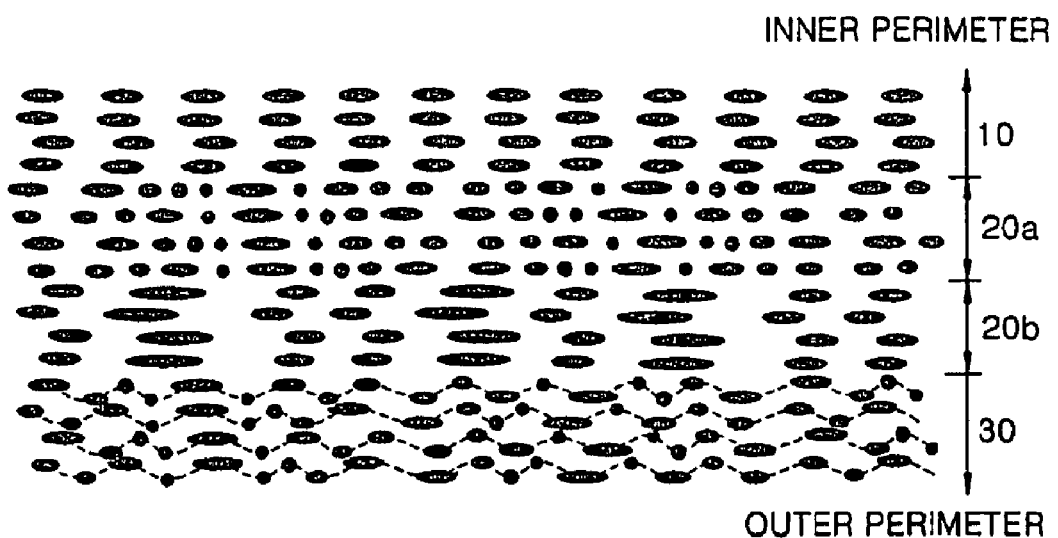

Furthermore, the pit pattern used in the first area 20*a* or the second area 20*b* may be different from the pit patterns used in the BCA 10 and the user data area 30. For example, as shown in FIG. 8A, pits are formed in the single pattern of the straight pit rows in the BCA 10, in the specific pattern of the straight pit rows in the first area 20*a*, and in the random pattern of the straight pit rows in the second area 20*b* and the user data area 30. As shown in FIG. 8B, pits are formable in the single pattern of the straight pit rows in the BCA 10, in the random pattern of the straight pit rows in the first area 20*a*, in the specific pattern of the straight pit rows in the second area 20*b*, and in the random pattern of the pit wobbles in the user data area 30.

As another example, the user data area 30 is dividable into two or more sub-areas. Pits may be formed in different pit patterns in the sub-areas, or the pit patterns used in the sub-areas may be different from a pit pattern used in the BCA 10 or the lead-in area 20. Also, different recording modulation methods are usable in the sub-areas, or the recording modulation methods used in the sub-areas may be different from a recording modulation method used in the BCA 10 or the lead-in area 20.

Figure 9:
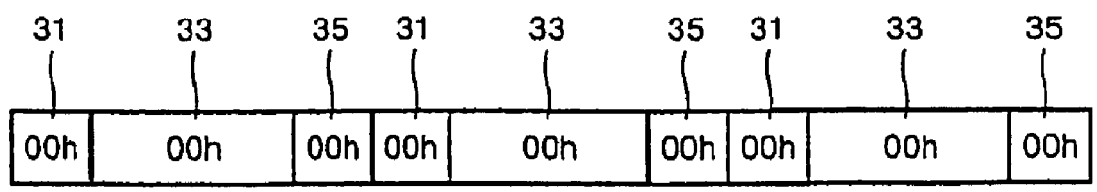
FIG. 9 illustrates a recording pattern of recording units, run-ins, and run-outs in the optical information storage medium shown in FIG. 6.

Meanwhile, when data is recorded in the user data area 30 (shown in FIG. 6), as shown in FIG. 9, the data is recorded in each of basic recording units 33. Run-ins 31 and run-outs 35 are located before and after the basic recording units 33. Here, the basic recording units 33 may be physical clusters, sectors, ECC blocks, frames, or the like. The run-ins 31 and the run-outs 35 are for accurately recording and/or reproducing data in the basic recording units 33. In other words, if data is recorded in the run-ins 31 or the run-outs 35 in slightly the wrong position, the run-ins 31 and the run-outs 35 corrects the error so that data is effectively recorded and/or reproduced.

Pits are formable in the run-ins 31 and the run-outs 35 in the same pit pattern as that used in the user data area 30. For example, when pits are formed in the random pattern of the straight pit row or the random pattern of the pit wobble in the user data area 30, pits are also formed in the random pattern of the straight pit row or the random pattern of the pit wobble in the run-ins 31 and the run-outs 35. As an example of the random pattern, "00*h*" is recordable. As shown in FIG. 9, pits may be recorded as "00h" in the run-ins 31, the basic recording units 33, and the run-outs 35.

In the meantime, pits may be formed in the run-ins 31 and the run-outs 35 in a different pit pattern from the user data area 30.

Data is recordable in a portion of at least one of a plurality of areas of an optical information storage medium using a different recording modulation method from the remaining areas of the optical storage medium.

For example, data is recordable in the first area 20*a* according to the RLL (d, k) modulation method and in the second area 20*b* according to the bi-phase modulation method. Alternatively, data is recordable in the first area 20*a* according to the bi-phase modulation method, and in the second area 20*b*, the BCA 10, and the user data area 30 according to the RLL (d, k) modulation method. In contrast, data is recordable in the first area 20*a* according to the RLL (d, k) modulation method, and in the second area 20*b*, the BCA 10, and the user data area 30 according to the bi-phase modulation method.

The present invention is applicable to an optical information storage medium having two or more recording layers as well as to an optical information storage medium having a single recording layer. In other words, the present invention is applicable to each recording layer of a multi-layer optical information storage medium.

As described above, an optical information storage medium generated by recording and/or reproducing methods according to the described embodiments ensures compatibility with a drive by prescribing a pit pattern or a recording modulation method used in a BCA, not in a data area. As a result, data reproduction efficiency can be improved and the optical information storage medium can be used conveniently. In addition, the optical information storage medium can maintain consistency with the format of a recordable optical information storage medium.

Although a few embodiments of the present invention have been shown and described, the present invention is not limited to the above-described embodiments. Instead, it would be appreciated by those skilled in the art that changes may be made in these embodiments without departing from the principles and spirit of the invention, the scope of which is defined by the claims and their equivalents.

What is claimed is:

1. A reproducing apparatus for use with a read-only optical information storage medium comprising a burst cutting area having a bar code, a lead-in area, and a user data area, the apparatus comprising:
   a reading unit configured to read data recorded in a form of pits in at least one of the lead-in area and the user data area; and
   a controller configured to control the reading unit to reproduce the data from the burst cutting area, said burst cutting area having an area in which a pattern comprising a sequence of pits is repeatedly recorded,
   wherein the pattern comprising the sequence of pits is other than the bar code and the pattern comprising the sequence of pits indicates 00h,
   wherein a first recording modulation method used for the pattern comprising the sequence of pits is different from a second recording modulation method used in at least one of the lead-in area and the user data area,
   wherein the second recording modulation method comprises a RLL (d, k) recording modulation method, and
   wherein at least one of the burst cutting area, the lead-in area, the user data area, and the lead-out area is divided into a plurality of sub-areas, the pits in the sub-areas being formed using the first or second recording modulation method.

2. The apparatus of claim 1, wherein the first recording modulation method is a bi-phase recording modulation method.

3. The apparatus of claim 1, wherein the lead-in area comprises first and second sub areas, the first area uses one of the RLL (d, k) modulation method and the bi-phase modulation method, and the second area uses a different recording modulation method from the first area.

4. A read-only optical information storage medium, comprising:

a burst cutting area comprising a bar code, a lead-in area, a data area, and a lead-out area, in which data is recorded in a form of pits, the burst cutting area having an area in which a pattern comprising a sequence of pits is repeatedly recorded, the pattern comprising the sequence of pits being other than the bar code and the pattern comprising the sequence of pits indicates 00h, a first recording modulation method used for the pattern comprising the sequence of pits being different from a second recording modulation method used in at least one of the lead-in area and the user data area, the second recording modulation method being a RLL (d, k) recording modulation method, wherein at least one of the burst cutting area, the lead-in area, the user data area, and the lead-out area is divided into a plurality of sub-areas, and the pits in the sub-areas are formed using the first or second recording modulation methods.

5. The read-only optical information storage medium of claim 4, wherein the lead-in area comprises first and second sub areas, the first area uses one of the RLL (d, k) modulation method and the bi-phase modulation method, and the second area uses a different recording modulation method from the first area.

* * * * *